United States Patent [19]

Simington

[11] 4,084,452
[45] Apr. 18, 1978

[54] OSCILLATING SAW CHAIN SHARPENER

[75] Inventor: Jack F. Simington, Chiloquin, Oreg.

[73] Assignee: Simington Products Co., Chiloquin, Oreg.

[21] Appl. No.: 740,718

[22] Filed: Nov. 10, 1976

[51] Int. Cl.² .............................................. B23B 63/16
[52] U.S. Cl. ...................................... 76/42; 76/25 A; 76/74
[58] Field of Search .................... 76/25 A, 42, 40, 41, 76/74, 43, 78; 51/96, 98, 98.5

[56] References Cited

U.S. PATENT DOCUMENTS

| | | | |
|---|---|---|---|
| 1,979,637 | 11/1934 | O'Neill | 76/42 |
| 3,006,222 | 10/1961 | McEwan | 76/25 A |
| 3,349,645 | 10/1967 | Silvey | 76/40 |
| 3,779,103 | 12/1973 | Silvey | 76/40 |

OTHER PUBLICATIONS

R. Treyco Saw Sharpening Fixture, Treyco Products Instructions, 4 pages.

Primary Examiner—Al Lawrence Smith
Assistant Examiner—Nicholas P. Godici
Attorney, Agent, or Firm—Clarence A. O'Brien; Harvey B. Jacobson

[57] ABSTRACT

A support is provided from which a drivable rotary grinding wheel is journaled for rotation about a first predetermined axis. A mount is also provided and is supported from the support from guided back and forth shifting relative thereto toward and away from the outer periphery of the grinding wheel along a predetermined path extending at least generally radially of the axis of rotation of the grinding wheel. The support means also supports the mount for limited oscillation of the mount about a second axis generally paralleling the first mentioned axis and the mount includes structure operative to support a length of saw chain therefrom.

7 Claims, 3 Drawing Figures

OSCILLATING SAW CHAIN SHARPENER

BACKGROUND OF THE INVENTION

The saw chain sharpener of the instant invention comprises an improvement over the saw chain sharpeners disclosed in my copending U.S. application Ser. Nos. 516,129, filed Oct. 18, 1974 and 697,745, filed June 18, 1976 now U.S. Pat. No. 4,044,635.

The instant invention includes a simplified mounting structure which may be pedestal mounted or provided with a suitable mounting base for attachment to and support from a work bench or the like. In addition, the sharpener includes structure whereby the opposite side cutting teeth of a saw chain may be correctly positioned relative to a grinding wheel and moved into and out of engagement with the grinding wheel in order to sharpen the teeth of the chain on opposite sides thereof.

SUMMARY OF THE INVENTION

The chain saw sharpener of the instant invention is constructed in a manner whereby slight clearance in the relatively movable chain saw supporting components thereof will have minimal effect in the desired proper positioning of a cutting tooth of a saw chain to be sharpened relative to the rotary grinding wheel of the sharpener.

Some forms of saw chain sharpening devices include slidably connection which require greater clearance than rotatable connections and other saw chain sharpeners include rotatable connections operative through a long support arm for determining proper positioning of a saw chain tooth to be sharpened. These types of connections enable unwanted variations in the positioning of successive saw chain teeth to be sharpened.

The main object of this invention is to provide an improved saw chain sharpener which will be operative to stationarily support saw chains having different thickness guide lugs in proper position with successive teeth of the chain supported in substantially the same indexed position for sharpening by a rotary grinding wheel.

Another object of this invention is to provide a saw chain sharpener including a chain support portion mounted for shifting relative a rotary grinding wheel support portion for oscillation about two right angularly disposed axes and with the relatively oscillatable components of the sharpener and their axis of oscillation being arranged relative to the saw chain supporting structure and the rotary grinding wheel in a manner such that slight necessary clearances in the pivot connections will have a minimal effect in varying the grinding position of successive saw chain teeth brought into the grinding or sharpening position.

A final object of this invention to be specifically enumerated herein is to provide a saw chain sharpener in accordance with the preceding objects and which will conform to conventional forms of manufacture, be of simple construction and easy to use so as to provide a device that will be econmically feasibly, longlasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
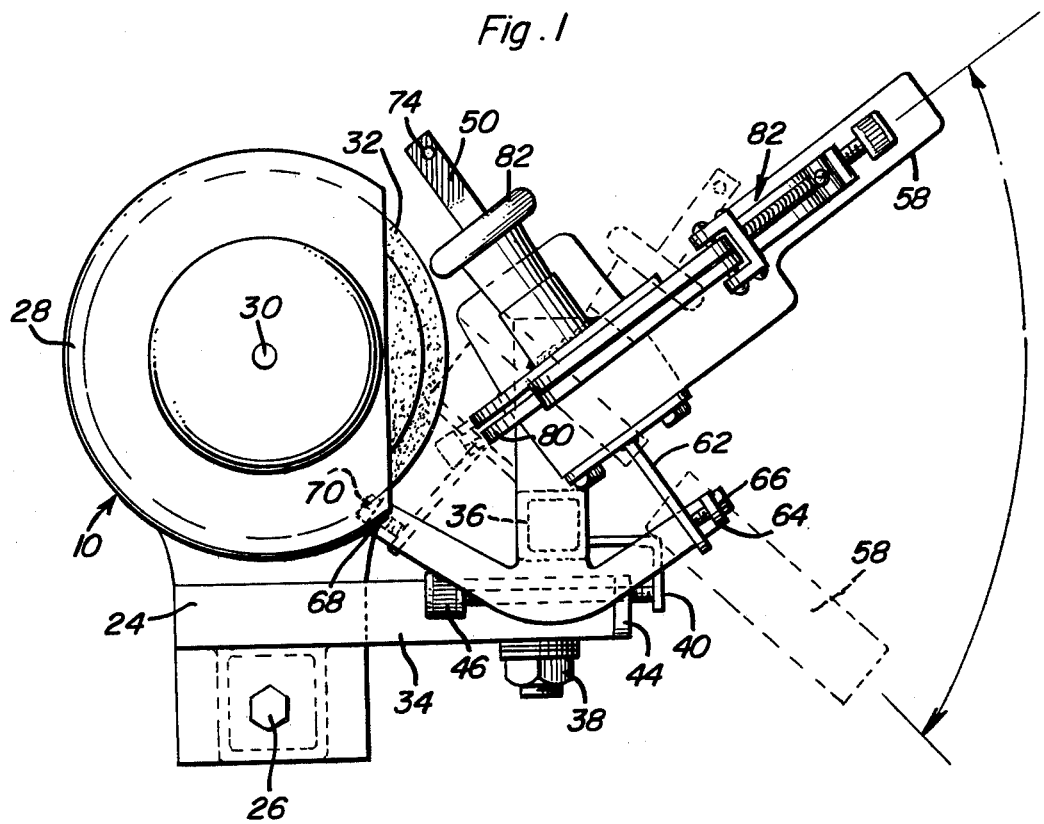
FIG. 1 is a top plan view of the improved chain saw sharpener of the instant invention.
Figure 2:
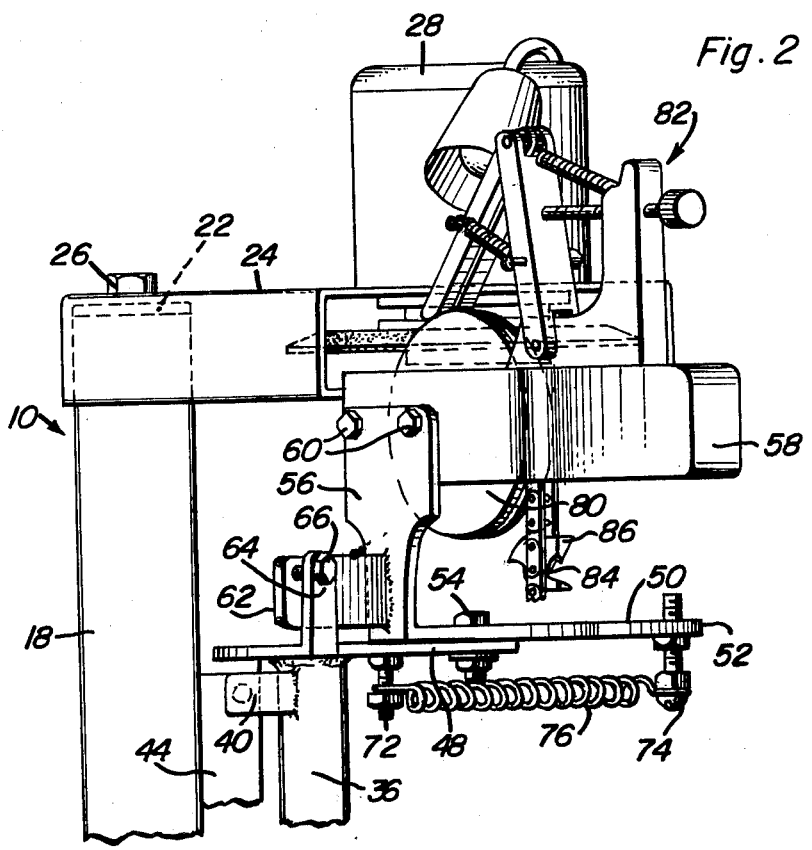
FIG. 2 is a fragmentary side elevational view of the chain saw sharpener as seen from the left side of FIG. 1.

Referring now more specifically to the drawings the numeral 10 generally designates the sharpener of the instant invention. The sharpener 10 includes a base assembly referred to in general by the reference numeral 12 consisting of an upright standard 14 having downwardly divergent legs 16 at its lower end adapted for support from a horizontal support surface.

The sharpener 10 further includes an upright support tube 18 which has its lower end telescoped downwardly over the upper end of the standard 14. The support tube 18 includes a pair of set screws 20 which may be tightened in frictional engagement with the standard 14 in order to secure the support tube 18 in position relative to the standard 14.

The upper end of the support tube 18 includes an upper mounting plate 22 secured thereover provided with a central upstanding threaded bore and one end of a motor support arm 24 is secured over the plate 22 by means of a mounting bolt 26 secured through the motor support arm 24 and threadly engaged in the aforementioned threaded bore. The other end of the motor support arm 24 supports an electric motor 28 of the reversible type therefrom and the motor 28 includes an output shaft 30 upon which a rotary grinding wheel 32 is mounted.

The lower end portion of the support tube 18 includes a horizontal outwardly projecting support arm 34 and the lower end of a mounting arm 36 is pivotally supported from the outer end of the support arm 34 by means of a pivot fastener 38 secured through the arms 34 and 36.

The upper portion of the mounting arm 36 includes an outstanding and laterally directed abutment flange 40 and an outstanding abutment lug 42. The free end of the support arm 34 includes an upstanding abutment arm 44 having a horizontal stop screw 46 threaded through its upper end.

The upper end of the mounting arm 36 is swingable toward and away from the support tube 18 and abutment of the abutment flange 40 with the stop screw 46 limits movement of the upper end of the mounting arm 36 toward the support tube 18 while abutment of the abutment lug 42 with the abutment arm 44 limits movement of the upper end of the mounting arm 36 away from the support tube 18.

The upper terminal end of the mounting arm 36 has a horizontal mounting plate 48 supported therefrom and an L-shaped mounting bracket 50 has its first horizontal flange portion 52 pivotally supported from the mounting plate 48 by means of a pivot fastener 54. The mounting bracket 50 includes a second vertical flange 56 which projects upwardly from the first flange 52 and the upper end of the second vertical flange 56 has one end of a horizontal support arm 58 secured thereto by means of suitable fasteners 60.

The lower end of the vertical flange 56 includes an outwardly projecting abutment flange 62 and the mounting plate 48 includes an upstanding support flange 64 from which a threaded abutment screw 66 is threadly supported. In addition, the mounting plate 48 includes a second upstanding support flange 68 from which a second abutment screw 70 corresponding to the abutment screw 66 is supported. The abutment flange 62 is succesively engageable with the abutment screws 66 and 70 to limit oscillation of the mounting bracket 50 about the pivot fastener 54.

The mounting plate 48 projects outwardly from one side of the mounting arm 36 and includes a depending anchor 72 adjacent the mounting arm 36. In addition, the end of the mounting bracket 50 remote from the mounting arm 36 includes a depending anchor 74 and an expansion spring 76 has its opposite ends anchored to the anchors 72 and 74.

As above set forth, the abutment flange 62 is engageable with the abutment screws 66 and 70 to limit oscillation of the mounting bracket 50 relative to the mounting plate 48 and the expansion spring 76 serves to yielding bias the mounting bracket 50 to the limit positions of oscillation thereof when the mounting bracket is swung past opposite sides of a center position relative to the mounting plate 48.

The support arm 58 includes a peripherally grooved support disc 80 rotatably supported therefrom corresponding to the similar disc disclosed in my copending U.S. application Ser. No. 697,745 and the disc 80 may be held in adjusted rotated positions by means of a threaded clamp nut or wheel 82. Further, the support arm 58 includes chain indexing structure referred to in general by the reference numeral 82 operatively associated with the disc and which is substantially identical to the chain indexing structure disclosed in my copending U.S. application Ser. No. 516,129.

In operation, a saw chain 84 to have its cutting teeth 86 sharpened is supported on the disc 80 with a selected tooth thereof on one side of the chain properly indexed in position on the disc 80 by means of the indexing structure 82. Then, the mounting bracket 50 is rotated to the corresponding limit position of oscillation thereof determined by one of the abutment screws screws 66 and 70 and the mounting arm 36 is thereafter swung from the phantom line position thereof illustrated in FIG. 3 to the solid line limit position thereof illustrated in FIG. 3 determined by the screw 46. By this support and movement of a properly indexed cutting tooth toward the grinding wheel 32 the cutting tooth will be properly ground. Thereafter, successive cutting teeth on the same side of the chain may be moved into proper indexed position for sharpening after the mounting arm 36 has been swung back to the phantom line position thereof illustrated in FIG. 3. After all of the teeth on one side of the chain have been sharpened, the mounting bracket 50 may be pivoted to its other limit position with a first of the cutting teeth on the other side of the chain 84 disposed in proper indexed position on the disc 80. Thereafter successive teeth on the otherside of the chain may be sharpened by moving the mounting arm 36 from the phantom line position thereof illustrated in FIG. 3 to the solid line position thereof illustrated in FIG. 3 after each successive proper indexing of the teeth to be sharpened.

Figure 3:
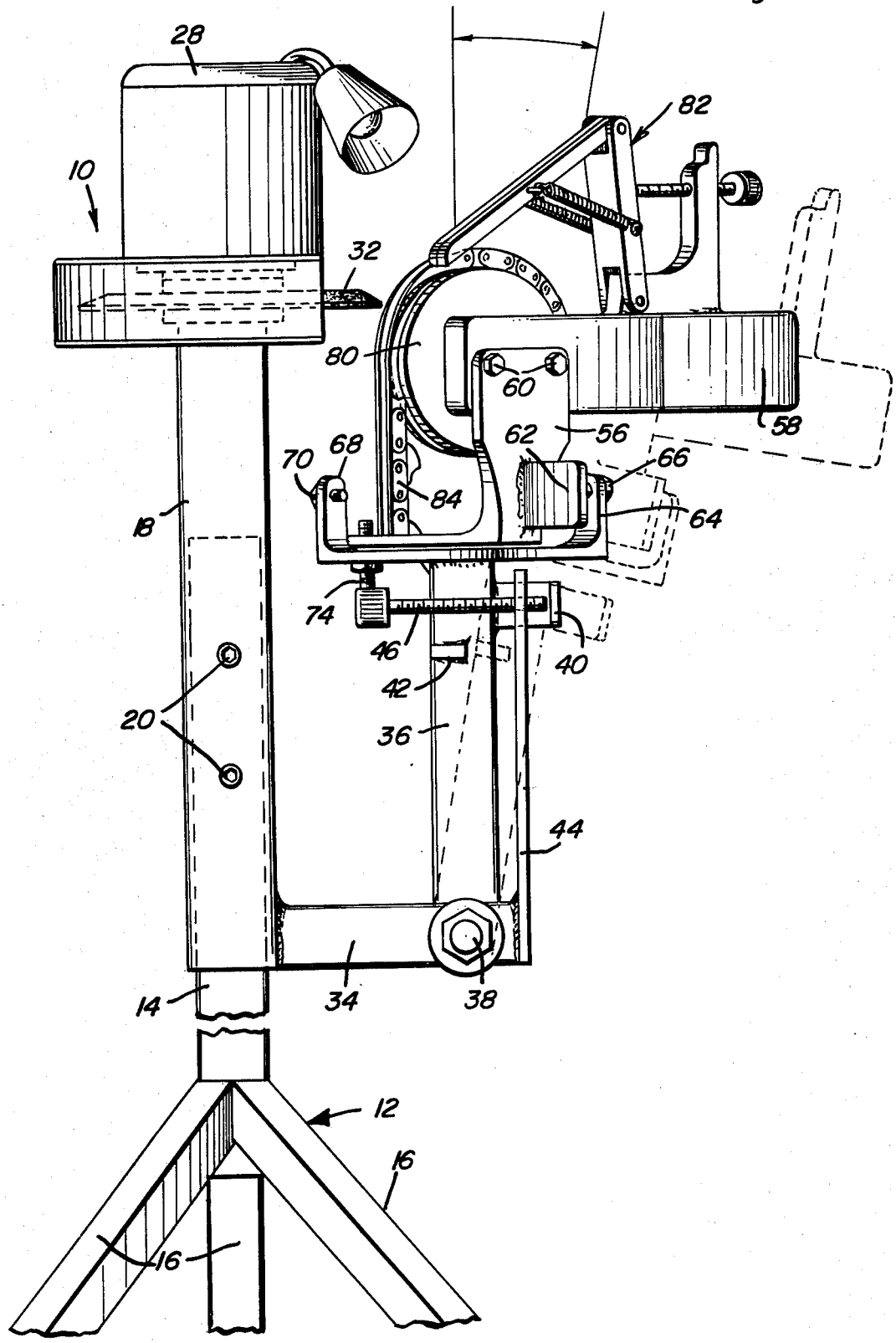
FIG. 3 is a side elevational view of the chain saw sharpener as seen from the left side of FIG. 2.

Inasmuch as the mounting arm 36 and the structure supported therefrom is overbalanced to the left as viewed in FIG. 3 when the mounting arm 36 is in the phantom line position thereof, the mounting arm 36 will naturally assume a position with the chain 84 moved out of position for grinding of the teeth thereof by the wheel. Further, inasmuch as the mounting arm 36 is disposed substantially upright when the tooth to be sharpened is brought into contact into periphery with the grinding wheel 32, any slight clearance of the pivot connection 38 will minimize any tendency of the tooth being sharpened to be not exactly properly indexed in position for sharpening. Also, any slack occuring in the pivot connection 54 will also minimize any variations in successive indexed positions of chain saw teeth to be sharpened. Accordingly, the teeth on opposite sides of the chain 84 may be identically sharpened for the most efficient operation of the saw chain 84 after it has been sharpened.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. In combination, a a support from which a drivable rotary grinding wheel is journaled for rotation about a first predetermined axis, a mount, support means supporting said mount from said support for guided back and forth shifting relative to said support toward and away from the outer periphery of said grinding wheel along a predetermined path extending at least generally radially of said axis and for limited oscillation of said mount about a second axis generally paralleling said first axis, said mount including means operative to support a length of saw chain therefrom, said support means including a mounting arm having one end pivotally supported from said support for rotation about a third axis generally normal to said first axis, said mount being supported from the other end of said mounting arm.

2. The combination of claim 1 wherein said second axis and mounting arm generally parallel each other.

3. The combination of claim 2 wherein said support means includes means operative to selectively adjust the limits of oscillation of said mount about said second axis.

4. The combination of claim 3 wherein said mount includes a grooved arcuate guide member over which a section of saw chain including guide lugs may be stationarily supported with said guide lugs guidingly received in said groove.

5. In combination, a support from which a drivable rotary grinding wheel is journaled for rotation about a first predetermined axis, a mount, support means supporting said mount from said support for guided back and forth shifting relative to said support toward and away from the outer periphery of said grinding wheel along a predetermined path extending at least generally radially of said axis, a bracket, means mounting said bracket on said mount for limited oscillation of said bracket about a second axis generally paralleling said first axis, said bracket including support structure operative to support a length of saw chain therefrom with said chain disposed in a plane at least closely paralleling said second axis and supported for guided lengthwise shifting relative to said bracket, said supporting structure including a grooved arcuate guide member over which a section of saw chain including guide lugs may be stationarily supported with said guide lugs guidingly received in said groove, said arcuate guide member comprising a disk mounted on said mount for adjustable angular displacement about its center axis, the outer periphery of said disk having a groove formed therein including two longitudinal portions of different width.

6. The combination of claim 5 wherein said support means includes means limiting movement of said mount away from said first axis.

7. The combination of claim 5 wherein said support means includes means operative to selectively adjust the limits of oscillation of said mount about said second axis.

* * * * *